Sept. 23, 1930.                J. B. ESTES                 1,776,655
SPOON SUPPORT
Filed March 14, 1929
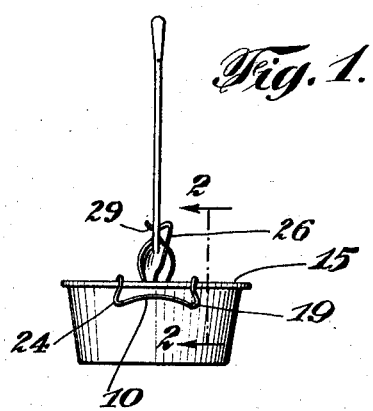
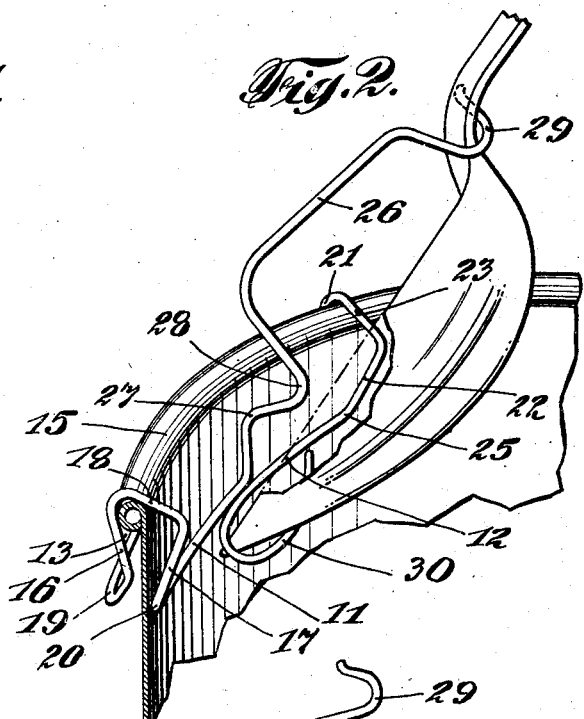
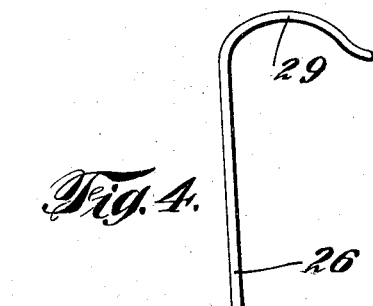
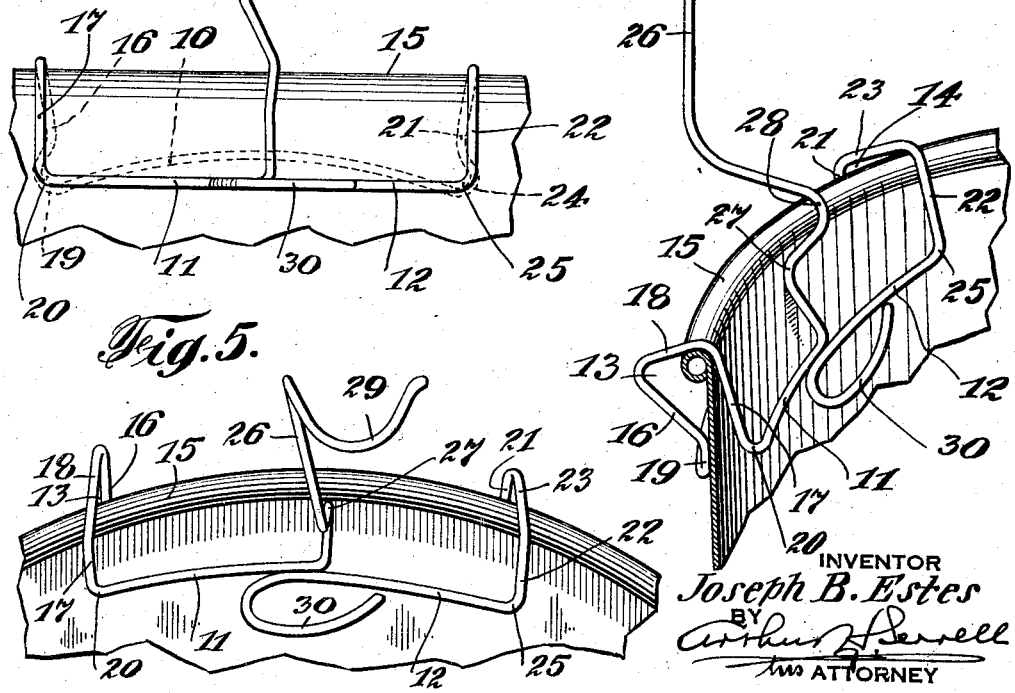
INVENTOR
Joseph B. Estes
BY
his ATTORNEY Patented Sept. 23, 1930

1,776,655

UNITED STATES PATENT OFFICE

JOSEPH B. ESTES, OF NEW YORK, N. Y.

SPOON SUPPORT

Application filed March 14, 1929. Serial No. 346,824.

This invention relates to a device for supporting a spoon or other similar utensil in conjunction with a pot or pan during cooking operations. In boiling or otherwise cooking various kinds of foods in a pan it is customary and oftentimes necessary to stir the food. A spoon or other utensil is generally employed for this purpose. When the necessary stirring has been accomplished and between different periods of stirring the food the spoon or other utensil must be supported in the pan by being left therein, or removed and placed elsewhere. In leaving the spoon in the pan it may become sufficiently hot to make it necessary to use a holder, or insulator, in handling the same and besides, the spoon may be the cause of other inconveniences when permitted to remain in the pot or pan. It is obviously also inconvenient to place the spoon elsewhere after a stirring operation and to take it up again when it is next necessary to stir the food.

The object of my invention is the provision of a spoon support or rest adapted to be associated with the rim of a pan or other cooking vessel and to be so constructed that when the spoon is being used for stirring the food the support may be shifted to one side out of the way and when the spoon is not being used to support the same in a position where it can be readily taken again for use when necessary.

In carrying out the invention the support for a spoon or other utensil is preferably so made as to span the rim portion of a pan, or other cooking vessel, and to be shifted thereon from one position to another wherein it is so placed as not to interfere with the stirring of the food by using the spoon and in another position to conveniently receive and support the spoon so that when necessary the spoon may be taken again for another stirring operation.

The device made in accordance with this invention will be hereinafter more particularly described in conjunction with the accompanying drawings in which Figure 1 is an elevation illustrating the use of the device, Fig. 2 is an enlarged sectional elevation on line 2—2, Fig. 1, Fig. 3 is a view similar to Fig. 2 showing the spoon removed and the support shifted to the non-use position, Fig. 4 is an elevation looking at the device from the inner side thereof, and Fig. 5 is a plan showing the parts in the position illustrated in Fig. 3.

Referring to the drawing it will be seen that in constructing the spoon support in accordance with this invention the same includes an outer bar 10 which is preferably curved upwardly between its ends, and also outwardly, to assume an arc corresponding approximately with the surfaces of a circular cooking pot, pan, or other vessel. The spoon support also includes an inner bar which as illustrated comprises members 11 and 12 which are substantial continuations of each other and which are curved between their ends to conform approximately with the inner surface of a cooking vessel.

The said bars at the ends thereof are connected by inverted U-shaped members indicated at 13 and 14. These end U-shaped members are similarly formed and are adapted to fit over or span the rim portion 15 of a cooking vessel so that the support is removable therefrom. The U-shaped end member 13 includes an outer leg 16, an inner leg 17 and a top 18. The leg 16 connects with the bar 10 and in its lower portion is provided with a bend or shoulder 19. The inner end of the leg 17 connects with that portion 11 of the inner bar and is provided with a bend or shoulder 20. Similarly the inverted U-shaped end 14 of the device includes an outer leg 21, an inner leg 22 and a top 23. The lower portion of the outer leg 21 connects with the bar 10 and at its lower portion is provided with a bend 24 forming a shoulder, and the lower portion of the inner leg 22 is provided with a bend 25 at that portion thereof which connects with the part 12 of the inner bar.

The device also includes an upright or standard 26 extending from the inner bar member and as illustrated forming a continuation of that part 11 thereof. At its lower end portion the standard 26 is formed in the shape of an ogee curve, the bend 27 of which, when the parts are in the position shown in Fig. 3, is adapted to contact with the inner face of the cooking vessel and the other bend 28 of which conforms generally to the rim of the cooking vessel. At its upper end the standard 26 is provided with a crooked portion 29 adapted to receive a portion of a handle of a spoon, or other utensil. The inner bar is constructed to include a loop 30 adapted to function as a receptacle for the outer end or tip of the bowl of a spoon, as is clearly indicated in Fig. 2 of the drawing. The shoulders 19 and 24 are so formed as to cooperate with the rim of the cooking vessel to prevent the spoon support from falling off or becoming disengaged therefrom even when the vessel is tipped or tilted for pouring operations. Furthermore, the bend 28 in the standard 26 is so formed as to engage the rim of the vessel to assist in maintaining it in place thereon when in the position shown in Fig. 3 and also to prevent the spoon or other utensil from being placed in the support in any manner other than that intended which is shown in Fig. 2.

As illustrated the device forming the improved spoon support is made from a piece of sufficiently stout wire, or other similar material, bent to the construction described. Obviously, however, the device may be otherwise constructed of suitably shaped metal to approximately the same form to function in the same or an equivalent manner. When in the position shown in Figs. 1 and 2 the upper ends or tops of the U-shaped end members and the outer legs thereof engage the rim of the cooking vessel and the bends 20 and 25 in the inner bar engage the inner surface of the cooking vessel, or the entire inner bar may be curved in some instances so as to engage the inner surface of the cooking vessel to maintain the support in the position shown in Fig. 2 wherein the tip of the spoon is adapted to be inserted in the loop 30, and the lower portion of the shank, or handle, of the spoon to be fitted into the crooked end 29 of the standard 26 in order to support the spoon. When, however, the spoon is in use the support may be shifted to the position shown in Fig. 3 in which the shoulders 19 and 24 engage the outer surface of the vessel, the inner legs and the adjacent parts of the tops of the U-shaped ends engage the rim of the vessel and the curved portion 27 of the standard or upright engages the inner surface of the vessel to maintain the support in a position in which it is so far out of the way as not to interfere in any manner with the use of the spoon in stirring the food which may be cooking in the vessel. Of course, it will be understood that the support is so made as to fit cooking vessels of various sizes within certain limits, which is sufficient, however, to include cooking vessels of different diameters as ordinarily employed. Furthermore, that the support device may be constructed in other and equivalent manners without departing from the nature and spirit of the invention.

I claim as my invention:

1. A spoon support for pots and pans comprising a curved outer bar adapted to lie on the outer side of a pan, a curved inner bar adapted to lie on the inner side of the pan, end members connecting the said inner and outer bars and each comprising inner and outer legs and a top, the said legs diverging from the bars to the top, a loop connected to the said inner bar and adapted to receive the tip of the bowl of a spoon, and a standard extending from the said inner bar and formed to receive a part of the handle of a spoon.

2. A spoon support for pots and pans comprising a curved outer bar adapted to lie on the outer side of a pan, a curved inner bar adapted to lie on the inner side of the pan, end members connecting the said bars and adapted to span the rim of a pan, an elliptical loop connected to the said inner bar and adapted to receive the tip of the bowl of a spoon, and a standard extending from the said inner bar and at its outer end having a crooked portion for receiving a part of the handle of a spoon.

3. A spoon support for pots and pans comprising an outer bar adapted to lie in the outer side of a pan, an inner bar adapted to lie on the inner side of the pan, inverted U-shaped end members connecting the ends of the said bars and adapted to span the rim of the pan, each end member comprising inner and outer legs and a top member, the said inner and outer legs diverging from the said bars to the said top member, an elliptical loop member connected to the said inner bar and adapted to receive the tip of the bowl of a spoon, and a standard extending from the said inner bar and provided at its outer end with a crooked portion to receive a part of the handle of a spoon.

Signed by me this 18th day of Feb., 1929.

JOSEPH B. ESTES.